(12) United States Patent
Nagata et al.

(10) Patent No.: US 9,544,159 B2
(45) Date of Patent: Jan. 10, 2017

(54) COMMUNICATION PROCESSING METHOD AND BASE STATION

(75) Inventors: Satoshi Nagata, Tokyo (JP); Xiang Yun, Beijing (CN); Lan Chen, Beijing (CN); Xiaoming She, Beijing (CN); Juejia Zhou, Beijing (CN); Hirohito Suda, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 52 days.

(21) Appl. No.: 14/006,764

(22) PCT Filed: Mar. 22, 2012

(86) PCT No.: PCT/JP2012/057392
§ 371 (c)(1),
(2), (4) Date: Oct. 3, 2013

(87) PCT Pub. No.: WO2012/128331
PCT Pub. Date: Sep. 27, 2012

(65) Prior Publication Data
US 2014/0016533 A1 Jan. 16, 2014

(30) Foreign Application Priority Data
Mar. 24, 2011 (CN) .......................... 2011 1 0072576

(51) Int. Cl.
*H04H 20/71* (2008.01)
*H04L 12/18* (2006.01)
(Continued)

(52) U.S. Cl.
CPC ............. *H04L 12/1881* (2013.01); *H04B 7/04* (2013.01); *H04B 7/0632* (2013.01);
(Continued)

(58) Field of Classification Search
CPC ........ H04W 72/005; H04W 4/06; H04W 8/26; H04W 4/08; H04W 8/186; H04W 72/12; H04W 72/1205; H04W 72/121; H04L 12/189; H04L 12/185; H04L 67/1044
(Continued)

(56) References Cited

U.S. PATENT DOCUMENTS 6,542,755 B1 * 4/2003 Tsukagoshi ................... 455/503
7,047,016 B2 * 5/2006 Walton ................. H04B 7/0417
370/335
(Continued)

FOREIGN PATENT DOCUMENTS

| FR | EP 2205035 A1 * | 7/2010 | ............ H04W 72/08 |
| JP | 2008-153864 A | 7/2008 | |
| JP | 2008-537442 A | 9/2008 | |

OTHER PUBLICATIONS

International Search Report issued in PCT/JP2012/057392 mailed on May 22, 2012 (2 pages).

*Primary Examiner* — Peter Cheng
*Assistant Examiner* — Sanjay K Dewan
(74) *Attorney, Agent, or Firm* — Osha Liang LLP (57) ABSTRACT

A base station receives channel state information corresponding to each of spare coordinated groups from each of user devices. A first group includes a plurality of coordinated groups arranged in advance. The spare coordinated groups corresponding to each user device are such as selected from the first group and include at least a service sector of best channel quality obtained measurement by the user device. The base station specifies a user device group corresponding to each of coordinated groups contained in each of coordinated group patterns. The user device group corresponding to the coordinated group is formed of user devices having the coordinated group in their spare coordinated groups. The base station uses channel state information reported from the user devices of the user device group corresponding to the coordinated group as a basis to perform user scheduling on the coordinated group.

34 Claims, 3 Drawing Sheets

(51) Int. Cl.
  *H04W 72/04* (2009.01)
  *H04B 7/04* (2006.01)
  *H04B 7/06* (2006.01)
  *H04W 16/28* (2009.01)
  *H04W 24/10* (2009.01)
  *H04W 72/12* (2009.01)
  *H04L 5/00* (2006.01)

(52) U.S. Cl.
  CPC ........ *H04B 7/0639* (2013.01); *H04W 72/046* (2013.01); *H04L 5/0035* (2013.01); *H04W 16/28* (2013.01); *H04W 24/10* (2013.01); *H04W 72/12* (2013.01)

(58) Field of Classification Search
  USPC ........................................................ 370/312
  See application file for complete search history.

(56) References Cited

U.S. PATENT DOCUMENTS

| | | | | |
|---|---|---|---|---|
| 8,306,055 | B2* | 11/2012 | Gong et al. | 370/465 |
| 8,560,678 | B2* | 10/2013 | Tseng | 709/224 |
| 2011/0059713 | A1* | 3/2011 | Okello | H04B 7/0491 455/296 |
| 2011/0081865 | A1* | 4/2011 | Xiao | H04W 52/243 455/63.1 |
| 2011/0141929 | A1* | 6/2011 | Razdan et al. | 370/252 |
| 2011/0170420 | A1* | 7/2011 | Xi | H04L 5/001 370/241 |
| 2011/0199913 | A1* | 8/2011 | Sundaresan et al. | 370/243 |
| 2011/0237272 | A1* | 9/2011 | Gorokhov | H04B 7/024 455/452.1 |
| 2012/0149348 | A1* | 6/2012 | Patel et al. | 455/416 |
| 2012/0163270 | A1* | 6/2012 | Chun et al. | 370/312 |
| 2012/0189077 | A1* | 7/2012 | Seo et al. | 375/267 |
| 2012/0269110 | A1* | 10/2012 | Walker et al. | 370/312 |
| 2013/0039326 | A1* | 2/2013 | Kim | H04B 7/024 370/329 |
| 2013/0064162 | A1* | 3/2013 | Phan et al. | 370/312 |
| 2013/0114562 | A1* | 5/2013 | Seo | H04W 52/146 370/329 |
| 2013/0148515 | A1* | 6/2013 | Ribeiro | H04L 5/0094 370/252 |
| 2013/0223258 | A1* | 8/2013 | Seo | H04W 24/02 370/252 |
| 2014/0092787 | A1* | 4/2014 | Han | H04W 76/046 370/280 |
| 2015/0003315 | A1* | 1/2015 | Chen et al. | 370/312 |

* cited by examiner

COMMUNICATION PROCESSING METHOD AND BASE STATION

TECHNICAL FIELD

The present invention relates to a communication processing method in the radio mobile communication field, and particularly to a coordinated multicast communication processing method for a base station and to the base station.

BACKGROUND ART

In an LTE (Long Term Evolution) system or LTE-A (Long Term Evolution-Advanced) system, antennas of a base station (eNodeB) are arranged in a 3-sector or 6-sector ULA (Uniform Linear Array) antenna pattern.

Figure 1:
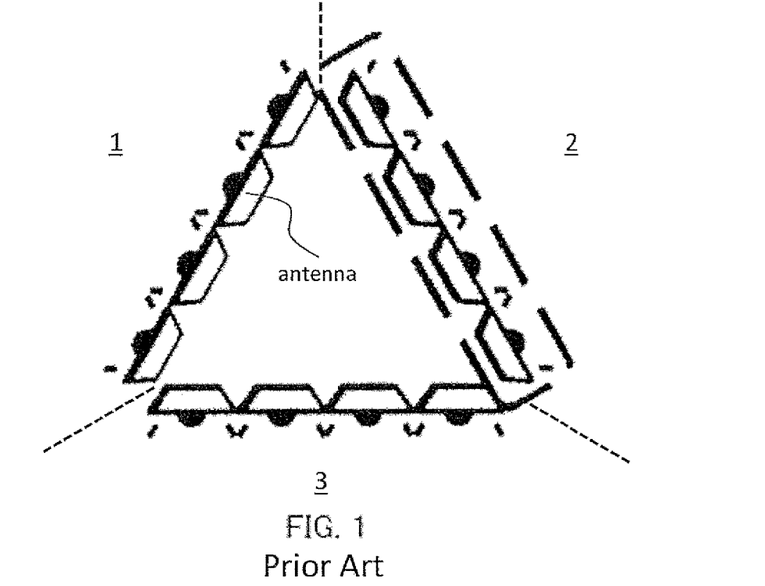
FIG. 1 is a diagram illustrating arrangement of 3-sector antennas in a conventional art.

The 3-sector antennas are arranged as illustrated in FIG. 1. Each of the three sectors 1, 2, and 3 has a coverage of 120 degrees and a plurality of beam antennas are arranged in each sector. These antennas are the same in horizontal directivity, which is shown in the center of the coverage of the corresponding sector. A cell to which the base station belongs is divided into three fixed sectors. A user measures RSRP (Reference Signal Receiving Power) and selects, as a service sector, one of the sectors which is of the strongest RSRP, that is, of greatest scale and best signal quality. The user performs channel estimation of channel state information of the service sector of the best channel quality, quantizes the channel state information of the service sector of the best channel quality by PMI (Precoding Matrix Indicator) and CQI (Channel Quality Indicator) and sends the result to the base station. In each sector of the base station, an algorithm such as PF (Proportional Fairness) or RR (Round-robin) is used to determine the priority order of uses in the sector and data is transmitted to a user of the highest priority.

SUMMARY OF INVENTION

Technical Problem

In a conventional system, antennas of a base station are arranged in such a manner that users of the cell belong to different sectors. A user located in the center of a sector is considered to be at the directional position of the sector antennas and be able to receive strong signals. On the other hand, a user located at the sector boundary is considered to be displaced from the directional position of the sector antenna, and therefore, received signals are weak. The user at the sector boundary has only to perform communication with use of fixed antennas. Therefore, there is great difference in performance between the user in the sector center and the user at the sector boundary.

The present invention has an objective of reducing the difference in performance between a user in the sector center and a user at the sector boundary, and thereby improving throughput of the user at the cell boundary and average throughput of the cell.

Solution to Problem

In order to achieve the above-mentioned objective, an aspect of the present invention is a communication processing method used in a base station having a plurality of sectors.

In this communication processing method, the base station receives channel state information corresponding to spare coordinated groups from each of user devices, a first group including a plurality of coordinated groups arranged in advance, each of the coordinated groups being formed of two or more sectors, and the spare coordinated groups corresponding to each of the user devices being selected from the first group and including at least a service sector of best channel quality obtained by measurement of the user device; the base station specifies a user device group corresponding to each of coordinated groups included in each of coordinated group patterns, the user device group corresponding to the coordinated group including user devices of which the corresponding spare coordinated groups include the coordinated group; the base station performs user scheduling on each of the coordinated groups based on channel state information reported by the user devices of the user device group corresponding to the coordinated group; and the base station specifies a user device and a coordinated group pattern to use in transmission based on scheduling results of the coordinated groups, and then performs data transmission based on the specified user device and the specified coordinated group pattern.

Further, in the above-mentioned communication processing method, the base station obtains an index of the service sector of best channel quality reported from each of the user devices; and the base station selects, for the user device, the spare coordinated groups including the service sector of best channel quality from the coordinated groups arranged in advance and reports the spare coordinated groups to the user device.

Furthermore, in the above-mentioned communication processing method, the base station reports the spare coordinated groups to the user devices by higher layers.

Furthermore, in the above-mentioned communication processing method, in the channel state information corresponding to all or a part of the spare coordinated groups reported by the user device, PMIs of channels corresponding to the respective spare coordinated groups are different from each other.

Furthermore, in the above-mentioned communication processing method, in the channel state information corresponding to all or a part of the spare coordinated groups reported by the user device, PMIs of channels corresponding to the respective spare coordinated groups are same as each other.

In order to achieve the above-mentioned objective, another aspect of the present invention is a base station having a plurality of sectors.

This base station comprises: a receiving module configured to receive channel state information corresponding to spare coordinated groups from each of user devices, a first group including a plurality of coordinated groups arranged in advance, each of the coordinated groups being formed of two or more sectors, and the spare coordinated groups corresponding to each of the user devices being selected from the first group and including at least a service sector of best channel quality; a user device group specifying module configured to specify a user device group corresponding to each of coordinated groups included in each of coordinated group patterns, the user device group corresponding to the coordinated group including user devices of which the corresponding spare coordinated groups include the coordinated group; a scheduling module configured to perform user scheduling on each of the coordinated groups based on channel state information reported by the user devices of the user device group corresponding to the coordinated group; a communication processing module configured to specify a user device and a coordinated group pattern to use in transmission based on scheduling results of the coordinated groups and perform data transmission based on the specified user device and the specified coordinated group pattern.

The base station further comprises: a first antenna specifying module configured to obtain an index of the service sector of best channel quality reported from each of the user devices; and a first spare coordinated group processing module configured to select, for the user device, the spare coordinated groups including the service sector of best channel quality from the coordinated groups arranged in advance and reporting the spare coordinated groups to the user device.

In the base station, the spare coordinated group processing module reports the spare coordinated groups to the user devices by higher layers.

In order to achieve the above-mentioned objective, another aspect of the present invention is a communication processing method for performing communication between a base station having a plurality of sectors and user devices.

In the communication processing method, each of the user devices measures signal quality of signals received from the respective sectors; each of the user devices specifies a service sector of best channel quality based on measurement results and reporting an index of the service sector of best channel quality to the base station; the base station selects, for each of the user devices, spare coordinated groups from a first group and reports the spare coordinated groups to the corresponding user device, the first group including a plurality of coordinated groups arranged in advance, each of the coordinated groups being formed of two or more sectors, and the spare coordinated groups corresponding to each of the user devices including at least the service sector of best channel quality of the user device; the base station receives channel state information corresponding to the spare coordinated groups from each of the user devices; the base station specifies a user device group corresponding to each of coordinated groups included in each of coordinated group patterns, the user device group corresponding to the coordinated group including user devices of which the corresponding spare coordinated groups include the coordinated group; the base station performs user scheduling on each of the coordinated groups based on channel state information reported by the user devices of the user device group corresponding to the coordinated group; and the base station specifies a user device and a coordinated group pattern to use in transmission based on scheduling results of the coordinated groups, and then performs data transmission based on the specified user device and the specified coordinated group pattern.

In order to achieve the above-mentioned objective, another aspect of the present invention is a communication processing method for performing communication between a base station having a plurality of sectors and user devices.

In the communication processing method, each of the user devices measures signal quality of signals received from the respective sectors; each of the user devices specifies a service sector of best channel quality based on measurement results; each of the user devices selects, for itself, spare coordinated groups from a pre-stored first group, the first group including a plurality of coordinated groups arranged in advance, each of the coordinated groups being formed of two or more sectors, and the spare coordinated groups corresponding to each of the user devices including at least the service sector of best channel quality of the user device; the base station receives channel state information corresponding to the spare coordinated groups from each of the user devices; the base station specifies a user device group corresponding to each of coordinated groups included in each of coordinated group patterns, the user device group corresponding to the coordinated group including user devices of which the corresponding spare coordinated groups include the coordinated group; the base station performs user scheduling on each of the coordinated groups based on channel state information reported by the user devices of the user device group corresponding to the coordinated group; and the base station specifies a user device and a coordinated group pattern to use in transmission based on scheduling results of the coordinated groups, and then performing data transmission based on the specified user device and the specified coordinated group pattern.

Advantageous Effects of Invention

The aspects of the present invention exert the following advantageous effects.

In the communication processing method and base station according to the specific aspects of the present invention, a coordinated group is immediately assigned to a user device based on a measurement result of signal quality of the user device and communication processing is performed based on the immediately assigned coordinated group. The user device does not perform communication using a fixed antenna of a fixed sector, but performs communication by selecting antennas of a plurality of sectors based on measured antenna communication quality to form a coordinated group and using a sector in the coordinated group. With this structure, it is possible to ensure communication using antennas of good communication quality for a user device, reduce difference in performance between a user at the sector boundary and a user at the sector center and to improve the system throughput.

DESCRIPTION OF EMBODIMENTS

In the communication processing methods and base stations according to the specific aspects of the present invention, a coordinated group is allocated to a user device immediately based on a measurement result of signal quality of the user device and communication processing is performed based on the coordinated group assigned immediately, thereby to reduce difference in performance between a user at a sector boundary and a user in a sector center and to improve throughput of the user at the cell boundary and average throughput of the cell by 5%.

Then, prior to detail explanation of examples of the present invention, an application environment will be described below.

Figure 2:
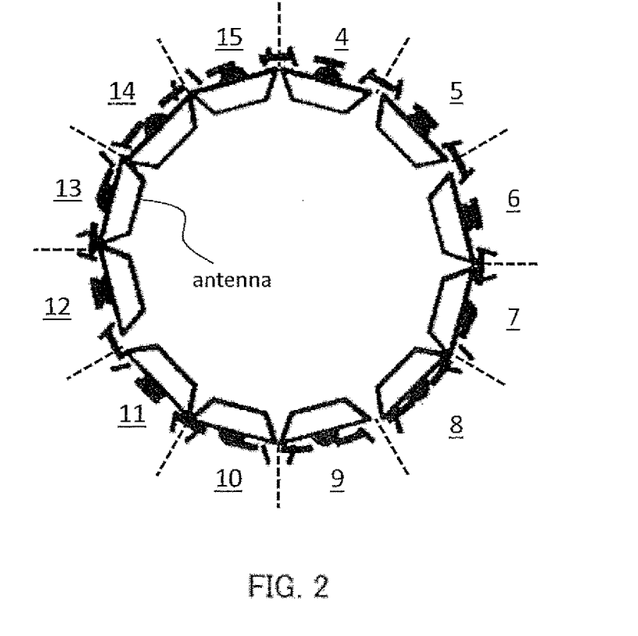
FIG. 2 is a diagram illustrating a first arrangement pattern of base station sectors used in embodiments of the present invention.

In an example of the present invention, there exists a base station having 12 sectors (labeled 4-15). When the 12 sectors have different physical sector indexes, they are indicated by the respective physical sector indexes. On the other hand, the 12 sectors have similar physical sector indexes, they are indicated by antenna indexes. Arrangement of the 12 sectors is illustrated in FIG. 2. The base station has the sectors arranged in an annular pattern.

The following description is made about two communication patterns, respectively, by way of example where 12 sectors have different physical sector indexes.

Figure 3:
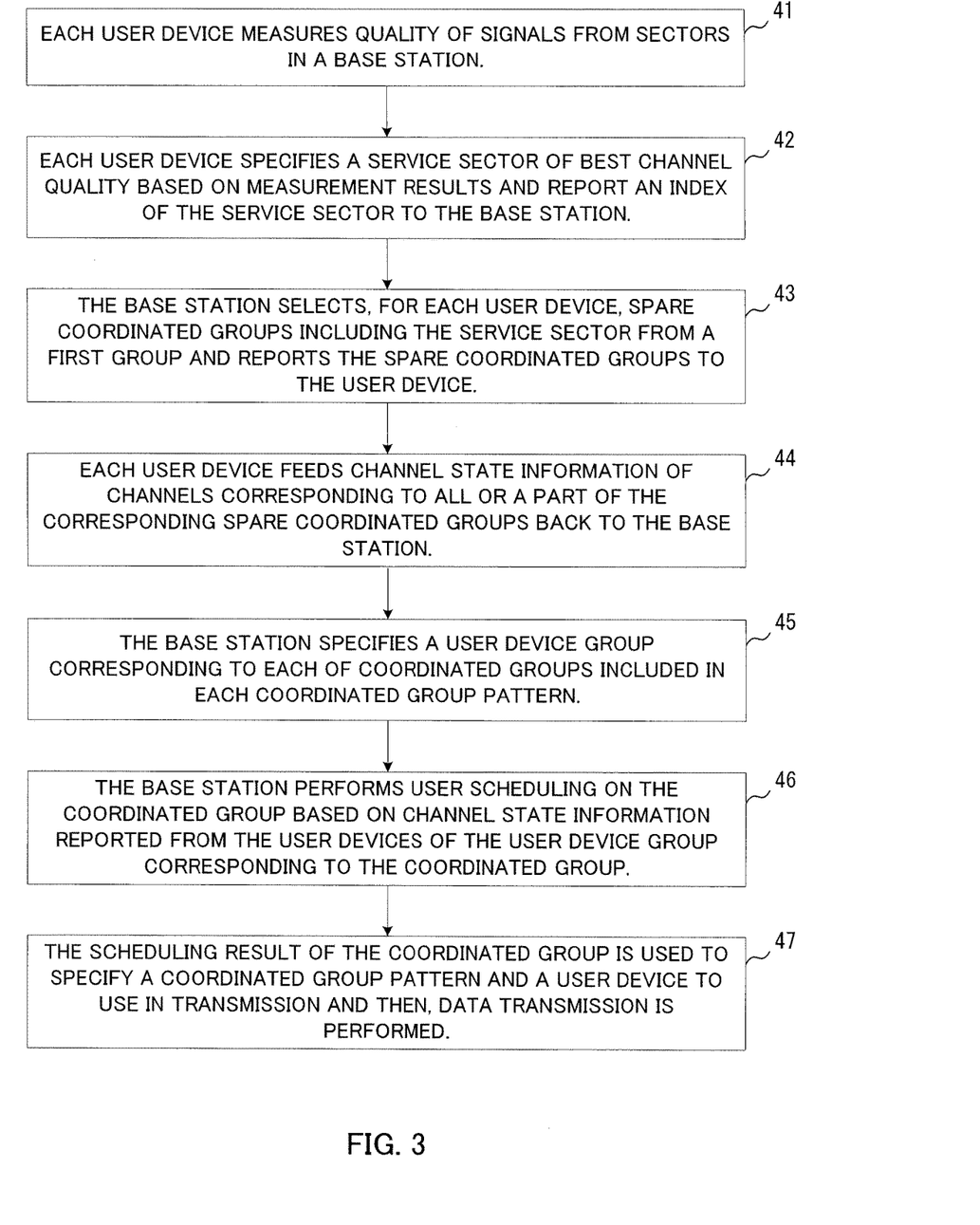
FIG. 3 is a flowchart of a method according to a first embodiment of the present invention.

As illustrated in FIG. 3, a communication processing method according to a first embodiment of the present invention has the following steps.

Step 41

Each user device measures signal quality of each of signals received from respective sectors.

Step 42

Each user device specifies a service sector of the best channel quality based on the measurement results and notifies the base station of a physical sector index (PCI: Physical Cell Index) of the service sector (Serving Cell).

Step 43

The base station chooses, for each user device, spare coordinated groups including the service sector of the best channel quality from a first group, and notifies the user device of the spare coordinated groups corresponding to the user device. The first group has a plurality of coordinated groups arranged in advance and each of the coordinated groups is formed of two or more sectors.

Step 44

Each user device feeds channel state information associated with all or a part of the spare coordinated groups of the user device back to the base station.

Step 45

The base station specifies a user device group corresponding to each coordinated group out of a plurality of coordinated groups contained in each of coordinated group patterns. Each coordinated group is formed of two or more sectors and each of the sectors belongs to only one coordinated group.

The user device group corresponding to the coordinated group is composed of user devices each having the coordinated group in the corresponding spare coordinated groups.

Step 46

The base station uses channel state information reported by the user device in the user device group corresponding to the coordinated group as a basis to perform user scheduling on each coordinated group.

Step 47

After specifying the user device and the coordinated group pattern to use in transmission based on the scheduling result of the coordinated group, data transmission is performed.

In the specific embodiment of the present invention, the sector may have a single antenna or a plurality of antennas.

As to the matter that "the user device group corresponding to the coordinated group is composed of user devices each having the coordinated group in the corresponding spare coordinated groups", it will be described by way of example.

It is assumed that a coordinated group A corresponds to a user device group B composed of a plurality of user devices A1 and the spare coordinated groups for the respective user devices A1 each have the coordinated group A.

Step A1

The base station obtains the physical sector index (PCI) of a service sector of the best channel quality from channel quality reports from each of user devices.

Step A2

The base station selects, for each of the user devices, spare coordinated groups including the service sector of the best channel quality from the first group, and the base station notifies the user device of the corresponding spare coordinated groups. The first group contains a plurality of coordinated groups arranged in advance and each of the coordinated groups is formed of two or more sectors.

Step A3

The base station receives, from each of the user devices, channel state information of all or a part of the spare coordinated groups associated with the user device.

Step A4

The base station specifies the user device group corresponding to each of coordinated groups contained in each of coordinated group patterns. Each coordinated group is formed of two or more sectors and the sectors belong to only one coordinated group.

The user device group corresponding to the coordinated group is composed of user devices each having the coordinated group in their corresponding spare coordinated groups.

Step A5

The base station uses channel state information reported from the user devices of the user device group associated with the coordinated group as a basis to perform user scheduling on the coordinated group.

Step A6

The base station specifies the user device and coordinated group pattern to use in transmission based on the scheduling result of the coordinated group, and after that, it performs data transmission based on the specified user device and coordinated group pattern.

In the specific embodiment of the present invention, the channel quality of the service sector is any one of large-scale channel quality, instantaneous channel quality and long-term statistical average channel quality.

The next description is made, by way of example, about a method of the first embodiment of the present invention.

Assuming that the number of sectors of a base station is N, the number of coordinated-group sectors of a first group is K, and K=1, ..., N, the first group is expressed as follows:

$$\bigcup_{K=1}^{N}\bigcup_{l=0}^{N-1}\{l \bmod N, (l+1) \bmod N, \ldots, (l+K-1) \bmod N\} \quad \text{[EXPRESSION 1]}$$

In this expression, l is a first sector index of the coordinated group. Assuming that the physical sector index of a service sector of which channel quality is best for a user is M, spare coordinated groups of the user include all coordinated groups containing the index M.

The example is shown below.

Assuming that the number N of sectors of the base station is given by N=12 and the number of spare-coordinated-group sectors is given by K=1, ..., 12, the first group is expressed as shown in the following table.

TABLE 1

| K = 1 | {1}, {2}, {3}, ..., {0} |
| K = 2 | {1, 2}, {2, 3}, {3, 4}, ..., {0, 1} |
| ... | ... |
| K = 11 | {1, 2, ..., 11}, {2, 3, ..., 0}, ..., {0, 1, ..., 10} |
| K = 12 | {1, 2, ..., 0} |

Assuming that the service sector of which the channel quality is best for the user device is the sector No. 4, spare coordinated groups for the user become as shown in the following table.

TABLE 2

| | |
|---|---|
| K = 1 | {4} |
| K = 2 | {4, 5}, {3, 4} |
| ... | ... |
| K = 11 | {4, ..., 0, ..., 2}, {3, 4, ..., 0, 1}, {2, ..., 4, ..., 0}, {1, ..., 4, ..., 11}, {0, ..., 4, ..., 10}, {11, ..., 4, ..., 9}, {10, ..., 4, ..., 8}, {9, ..., 4, ..., 7}, {8, ..., 4, ..., 6}, {7, ..., 4, 5}, {6, ..., 4} |
| K = 12 | {1, 2, 3, 4, 5, 6, 7, 8, 9, 10, 11, 0} |

In the specific embodiment of the present invention, it is possible to reduce the number of spare coordinated groups by imposing restrictions in an actual system. For example, in a precoding system, if four antennas are used in transmission and quantization is made with 4-antenna codebook, the number of antennas contained in the spare coordinated groups becomes 4. If one antenna is provided in each sector, the number K of sectors contained in the coordinated group is given by K=4, and the first group can be expressed as shown in the following table.

TABLE 3

| | |
|---|---|
| K = 4 | {1, 2, 3, 4}, {2, 3, 4, 5}, {3, 4, 5, 6}, ..., {0, 1, 2, 3} |

When the sector with the physical sector index "4" is a sector of the best channel quality for the user device, the spare coordinated groups of the user become as shown in the following table.

TABLE 4

| | |
|---|---|
| K = 4 | {4, 5, 6, 7}, {3, 4, 5, 6}, {2, 3, 4, 5}, {1, 2, 3, 4} |

In the first embodiment of the present invention, the base station needs to issue spare coordinated groups for the user device. These spare coordinated groups may be communicated to the user side by a higher layer (radio resource control layer, radio link control layer, packet data convergence protocol layer, media access controller layer or the like).

For example, the spare coordinated groups may be reported to the user device in the following data format. It contains two fields, that is, a spare coordinated group ID field and a sector ID field. The spare coordinated group ID field indicates the number of each of all available spare coordinated groups for reporting, and the sector ID field indicates sectors contained in each spare coordinated group.

In the above-mentioned example, the base station may notify the user device of the sector ID contained in each spare coordinated group. Data to be transmitted is given below.

1 1 2 3 4 2 2 3 4 5 3 3 4 5 6 4 4 5 6 7

When obtaining the spare coordinated groups, each user device needs to give channel state information of all or a part of the spare coordinated groups as feedback to the base station.

Figure 4:
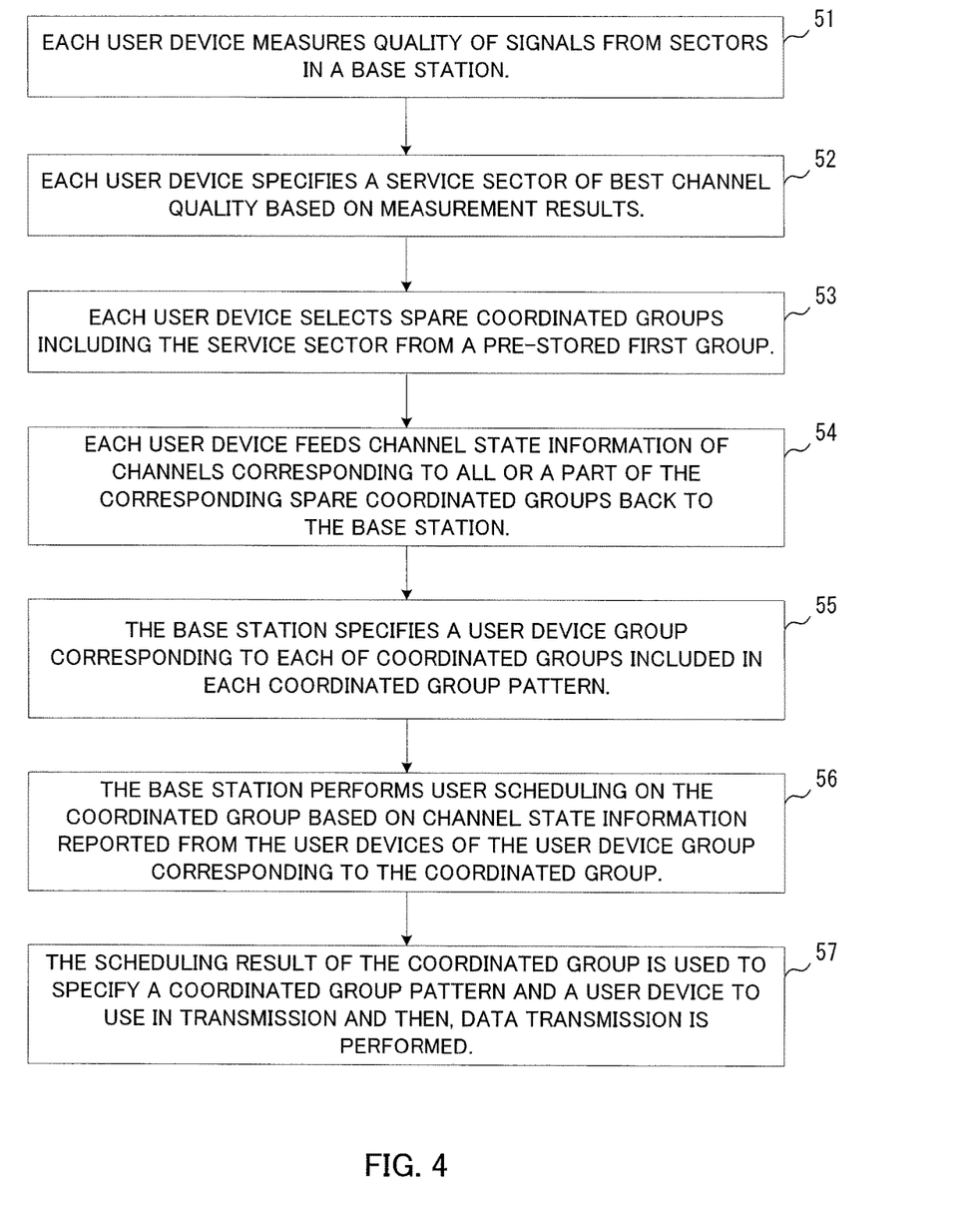
FIG. 4 is a flowchart of a method according to a second embodiment of the present invention.

As illustrated in FIG. 4, the communication processing method according to the second embodiment of the present invention has the following steps:

Step 51

Each user device measures channel quality of each of signals received from respective sectors.

Step 52

Each user device specifies a service sector of the best channel quality based on the measurement results.

Step 53

Each user device selects spare coordinated groups containing the service sector of the best channel quality from a pre-stored first group. The first group contains a plurality of coordinated groups arranged in advance and each of the coordinated groups is formed of two or more sectors.

Step 54

Each user device gives channel state information of all or a part of the corresponding spare coordinated groups to the base station as feedback.

Step 55

The base station specifies a user device group corresponding to each of coordinated groups contained in each coordinated group pattern. Each coordinated group is formed of two or more sectors, and in any one of the coordinated group patterns, each of the plural sectors belongs to only one coordinated group.

The user device group corresponding to the coordinated group is formed of user devices each having the coordinated group in the corresponding spare coordinated groups.

Step 56

The base station uses, as a basis, the channel state information reported by the user devices in the user device group associated with the coordinated group to perform user scheduling on the coordinated group.

Step 57

The base station specifies the user device and coordinated group pattern to use in transmission based on the scheduling result of the coordinated group and after that, it performs data transmission.

Seen from the base station side, the communication processing method according to the second embodiment of the present invention has the following steps:

Step B1

The base station receives, from each user device, channel state information of all or a part of the spare coordinated groups of the user device.

The spare coordinated groups of the user device are spare coordinated groups containing a service sector of the best channel quality out of the first group pre-stored by the user device.

The first group contains a plurality of coordinated groups arranged in advance and each of the coordinated groups is formed of two or more sectors.

Step B2

The base station specifies the user device group associated with each of coordinated groups contained in each of coordinated group patterns. Each of the coordinated groups is formed of two or more sectors, and in any one of the coordinated group patterns, each of the sectors belongs to only one coordinated group.

The user device group corresponding to the coordinated group is formed of user devices having the coordinated group in their corresponding spare coordinated groups.

Step B3

The base station uses, as a basis, the channel state information reported by the user devices in the user device group corresponding to the coordinated group to perform user scheduling for the coordinated group.

Step B4

The base station specifies the user device and coordinated group pattern to use in transmission based on the scheduling result of the coordinated group and after that, it performs data transmission based on the specified coordinated group pattern and user device.

The second embodiment is different from the first embodiment in the following points. First, in the first embodiment, selecting of spare coordinated groups by the base station is required for the user device, while, in the second embodiment, it is the user device that selects spare coordinated groups from pre-stored groups by itself. And, in the second embodiment, it is necessary to synchronize the first group between the base station and the user device, while in the first embodiment, there is no need to synchronize the first group between the base station and the user device, and the base station selects the spare coordinated groups for the user based on the measurement results reported from the user device, and notifies the user device of the result.

In the second embodiment, synchronization of the first group between the base station and the user device can be realized by various systems, which are described below.

System 1

The base station reports all available coordinated groups directly to the user device. Assuming that there are 12 sectors and each coordinated group has 4 sectors, the base station may report the following 12 coordinated groups and their combination IDs directly to the user device.

{0,1,2,3}, {1,2,3,4}, {2,3,4,5}, . . . , {11,0,1,2}

When the user device gives channel state information associated with each of spare coordinated groups as feedback to the base station, the base station can recognize of which spare coordinated group the user device has reported the channel state information only by holding the coordinated group ID simultaneously.

System 2

The base station reports M and N to the user device. M is the number of sectors of the base station and N is the number of sectors of a coordinated group. The user device obtains available coordinated groups based on M and N.

For example, when there are 12 antennas and each coordinated group has 4 sectors, the base station has only to notify the user of "12" and "4". Then, the user device obtains the following coordinated groups, that is, the corresponding combination ID based on "12" and "4" thereby to be able to realize synchronization between the base station and the user device.

{0,1,2,3}, {1,2,3,4}, {2,3,4,5}, . . . , {11,0,1,2}

When giving channel state information as feedback, the user device holds the ID of each spare coordinated group simultaneously. Only by this process, the base station can recognize of which spare coordinated group the channel state information is reported from the user device.

In the specific embodiment, the channel state information is associated with the communication scheme between the user device and base station. For example, when transmission is performed in a precoding scheme, it is necessary to give PMI (Precoding Matrix Indicator) and CQI (Channel Quality Indicator) as feedback. On the other hand, when transmission is not performed in the precoding scheme, it is necessary to give only CQI as feedback. Needless to say, in any other communication scheme, there is information required to be given as feedback for scheduling by the base station. Here, description is made in detail only about channel state information to be given as feedback when transmission is performed in the precoding scheme.

In the specific embodiment of the present invention, it is possible to select different PMIs for spare coordinated groups individually by algorithm, and it is also possible to select the same PMI for all the spare coordinated groups. This is explained below.

Assuming that there are N spare coordinated groups and M precoding vectors in a codebook, the user device can obtain data shown in the following table.

TABLE 5

|  | PMI1 | PMI2 | ... | PMI M |
|---|---|---|---|---|
| COORDINATED GROUP 0 | $CQI_{(0,1)}$ | $PCQI_{(0,2)}$ | ... | $CQI_{(0,M)}$ |
| COORDINATED GROUP 1 | $CQI_{(1,1)}$ | $CQI_{(1,2)}$ | ... | $CQI_{(1,16)}$ |
| ... | ... | ... | ... | ... |
| COORDINATED GROUP N | $CQI_{(N,1)}$ | $CQI_{(N,2)}$ | ... | $CQI_{(N,M)}$ |

In the system 1, PMI and CQI to be given as feedback per coordinated group are expressed as follows:

$$\begin{cases} PMI_{(i)} = \operatorname*{argmax}_{1 \leq j \leq M}(CQI_{(i,j)}) \\ CQI_{(i)} = CQI_{(i,PMI_{(i)})}, \end{cases} \quad i = 0, 1, \ldots, N \qquad \text{[EXPRESSION 2]}$$

In the system 2, PMIs to be given as feedback is the same for all coordinated groups, however, CQI varies as follows:

$$\begin{cases} PMI_{(i)} = \operatorname*{argmax}_{1 \leq j \leq M}\left(\sum_{i=0}^{N} CQI_{(i,j)}\right) \\ CQI_{(i)} = CQI_{(i,PMI_{(i)})}, \end{cases} \quad i = 0, 1, \ldots, N \qquad \text{[EXPRESSION 3]}$$

In the system 3, both of PMIs and CQIs to be given as feedback are the same for all coordinated groups and the lowest CQI in all the coordinated groups is determined to be given as feedback, which is expressed as follows:

$$\begin{cases} PMI_{(i)} = \operatorname*{argmax}_{1 \leq j \leq M}\left(\sum_{i=0}^{N} CQI_{(i,j)}\right) \\ CQI_{(i)} = \min(CQI_{(i,PMI_{(i)})}), \end{cases} \quad i = 0, 1, \ldots, N \qquad \text{[EXPRESSION 4]}$$

where N is the number of spare coordinated groups.

In the above-mentioned system, PMI and CQI are given as feedback per spare coordinated group. Note that PMIs to be given as feedback may the same or vary, and CQI also may be the same or vary.

In the specific embodiment of the present invention, they may be given as feedback in yet another system, which will be described below.

In the scheme 4, some spare coordinated groups are selected from the spare coordinated groups. The greatest CQI of any one out of the selected spare coordinated groups is equal to or greater than the greatest CQI of any one of the un-selected spare coordinated groups. And, the greatest CQI and PMI corresponding to the greatest CQI are given as feedback for each of the selected spare coordinated groups.

In the system 5, some spare coordinated groups are selected from the spare coordinated groups. Then, the greatest CQI of any one of the selected spare coordinated groups is equal to or greater than the greatest CQI of any one of the un-selected spare coordinated groups. And, the same PMI is given as feedback for each of the selected spare coordinated groups. The sum of CQIs of all the selected spare coordinated groups, corresponding to the PMI, is the greatest. And, the same CQI is given as feedback for each of the selected spare coordinated groups. The CQI is a maximum value, minimum value or average value of CQIs corresponding to the feedback PMI of all the selected spare coordinated groups.

Needless to say, still another system may be used to obtain PMI and CQI, however, their detailed explanation is omitted here.

And, in the system 3, the feedback overhead is reduced, but the increase in throughput performance of the system is also reduced. This is demonstrated in the following simulation results.

The first and second embodiments of the present invention have respective merits. The second embodiment is relatively simple in system flow, however, it is necessary to synchronize relatively large antenna group information between the base station and user device.

In both of the first and second embodiments, the base station specifies a user device group corresponding to each coordinated group out of a plurality of coordinated groups contained in each coordinated group pattern, and then, it performs user scheduling for each coordinated group based on the channel state information reported from the user device. This is described by way of example below.

The embodiments are indistinguishable in view of the system throughput. The coordinated group pattern includes a plurality of coordinated groups that do not overlap each other, and each coordinated group has a plurality of sectors in a coordinated multicast cell in a user cell.

Assume that there are 4 coordinated group patterns as follows:

Coordinated group pattern 1:
 Coordinated group X1 corresponding to sectors 1, 2, 3 and 4
 Coordinated group X2 corresponding to sectors 5, 6, 7 and 8
 Coordinated group X3 corresponding to sectors 9, 10, 11 and 0

Coordinated group pattern 2:
 Coordinated group Y1 corresponding to sectors 2, 3, 4 and 5
 Coordinated group Y2 corresponding to sectors 6, 7, 8 and 9
 Coordinated group Y3 corresponding to sectors 10, 11, 0 and 1

Coordinated group pattern 3:
 Coordinated group Z1 corresponding to sectors 3, 4, 5 and 6
 Coordinated group Z2 corresponding to sectors 7, 8, 9 and 10
 Coordinated group Z3 corresponding to sectors 11, 0, 1 and 2

Coordinated group pattern 4:
 Coordinated group W1 corresponding to sectors 4, 5, 6 and 7
 Coordinated group W2 corresponding to sectors 8, 9, 10 and 11
 Coordinated group W3 corresponding to sectors 0, 1, 2 and 3

As is clear, each coordinated group pattern has 3 coordinated groups and each coordinated group has 4 sectors. In any one coordinated group pattern, each of the sectors belongs only to one coordinated group. In specifying a user device group associated with a coordinated group in a coordinated group pattern, the base station has only to consider whether or not the coordinated group is included in channel state information corresponding to all or some of the spare coordinated groups given as feedback from the user device. When it is included, the user device belongs to the user device group associated with the coordinated group and when it is not included, the user device does not belong thereto.

For example, in the case of the coordinated group X1 of the coordinated group pattern X1, if the spare coordinated groups of the user device A include the sectors 1, 2, 3 and 4, the user device A belongs to the user device group associated with the coordinated group X1, and if not, the device A does not belong to the user device group associated with the coordinated group X1.

After specifying the user device group associated with each coordinated group, the base station can perform user scheduling based on channel state information reported by the user device. For example, when the base station performs scheduling by algorithm such as proportional fairness or round-robin, one or a plurality of users can be scheduled per coordinated group of each coordinated group pattern. The users scheduled to each coordinated group in each coordinated group pattern can be used as a basis to calculate the priority order of coordinated group patterns.

Finally, a coordinated group pattern of the highest priority and user devices scheduled of each coordinated group in the coordinated group pattern may be selected to perform data transmission.

According to the present invention, by designing the method of user-side feedback of coordinated multicast in a base station and scheduling at the base station side, it is possible to improve average throughput of the system and further improve throughput of the user at the sector boundary, thereby reducing difference in performance between the user at the sector boundary and a user at the sector center.

In order to demonstrate the effects of the embodiments of the present invention, simulation was performed as to the method of the embodiments of the present invention. The simulation conditions are given below:

TABLE 6

| | CONVENTIONAL METHOD | METHOD OF THE PRESENT INVENTION |
|---|---|---|
| TOPOLOGY STRUCTURE | 19 CELLS 3 SECTORS PER CELL | 19 CELLS 12 SECTORS PER CELL |
| NUMBER OF ANTENNAS | BASE STATION: 4 ANTENNAS PER SECTOR USER: 2 ANTENNAS | BASE STATION: 1 ANTENNA PER SECTOR USER: 2 ANTENNAS |
| BASE STATION ANTENNA CORRELATION | 0.95 PER SECTOR | 0.95 PER COORDINATED GROUP |
| MULTIPLEXING SCHEME AND BANDWIDTH | FREQUENCY DIVISION MULTIPLEXING DOWNLINK 10M BANDWIDTH | |

TABLE 6-continued

| | CONVENTIONAL METHOD | METHOD OF THE PRESENT INVENTION |
|---|---|---|
| CHANNEL MODEL | TU CHANNEL | |
| CARRIER FREQUENCY | 2 GHz | |
| DOWNLINK SCHEME | SINGLE USER MIMO | |
| SUBBAND BANDWIDTH | 1.08 MHz (6 RESOURCE BLOCKS (RBs)) | |
| BASE STATION TRANSMISSION POWER | 46 dBm | |
| SCHEDULING METHOD | FREQUENCY DOMAIN PROPORTIONAL FAIRNESS SCHEDULING | |
| TRAFFIC MODEL | FULL BUFFER | |
| CONTROL DELAY TIME | 4 MILLISECONDS | |
| FEEDBACK INTERVAL OF CHANNEL STATE INFORMATION | 1 MILLISECOND | |
| CHANNEL ESTIMATION/CHANNEL QUALITY INFORMATION MEASUREMENT | ACTUAL CHANNEL ESTIMATION BASED ON CHANNEL REFERENCE SIGNALS | |
| USER RECEIVER | MINIMUM MEAN SQUARE ERROR RECEIVER | |

Simulation results are shown below:

TABLE 7

| | CELL AVERAGE THROUGHPUT (Mbps) | 5% CELL-EDGE USER THROUGHPUT (Mbps) |
|---|---|---|
| Conventional method | 23.52 | 0.949 |
| METHOD OF THE PRESENT INVENTION CIRCULARLY ARRANGED ARRAY ANTENNAS (THE SAME PMI AND CQI ARE FED BACK FOR ALL THE COORDINATED GROUPS) | 24.81 (+5.5%) | 1.207 (+27.19%) |
| METHOD OF THE PRESENT INVENTION CIRCULARLY ARRANGED ARRAY ANTENNAS (DIFFERENT PMIS AND DIFFERENT CQIS ARE FED BACK FOR THE COORDINATED GROUPS) | 25.99 Mbps (+10.50%) | 1.270 Mbps (+33.82%) |

As compared with the conventional system, when adopting the multicast technique in the 12-sector arrangement and the feedback method of feeding the same PMI and CQI back for all the coordinated groups, it is possible to realize a 5.5% gain in cell average throughput and a 27% gain in cell-edge user throughput without any increase in feedback overhead. When adopting the feedback method of feeding back different PMIs and different CQIs for respective coordinated groups, it is possible to improve the throughput with an increase in cost. With this method, it is possible to realize a gain of about 10% in cell average throughput and a gain of about 34% in cell-edge user throughput.

According to the embodiments of the present invention, there is provided a base station having a plurality of sectors.

The base station has a receiving module configured to receive channel state information corresponding to spare coordinated groups from each of user devices; a user device group specifying module configured to specify a user device group corresponding to each coordinated group out of a plurality of coordinated groups included in each of coordinated group patterns, the user device group corresponding to the coordinated group including user devices of which corresponding spare coordinated groups include the coordinated group; a scheduling module configured to perform user scheduling on the coordinated group based on the channel state information reported from the user device in the user device group corresponding to the coordinated group; and a communication processing module configured to specify a user device and a coordinated group pattern to use in transmission based on scheduling results of the coordinated group and perform data transmission based on the specified user device and the specified coordinated group pattern.

When the coordinated groups are not synchronized between the base station and the user device, the above-mentioned base station further comprises a first antenna specifying module configured to obtain a physical sector index (PCI) of a service sector of best channel quality reported from each user device and a first spare coordinated group processing module configured to select, for the user device, spare coordinated groups including the service sector of best channel quality of the user device from coordinated groups arranged in advance and to report the spare coordinated groups to the user device.

The spare coordinated group processing module is configured to report the spare coordinated groups to the user device by a higher layer.

In channel state information associated with spare coordinated groups reported from the user devices, PMIs of channels corresponding to the respective spare coordinated groups are different from each other.

In channel state information associated with spare coordinated groups reported from the user devices, PMIs of channels corresponding to the respective spare coordinated groups are equal to each other.

Up to this point, the preferable embodiments of the present invention have been described. A person of ordinary skill in the art could make any improvements based on the principle of the present invention. These improvements should be recognized as falling within the scope of the present invention.

The disclosure of Chinese Patent Application No. 201110072576.5, filed on Mar. 24, 2011, including the specification, drawings, and abstract, is incorporated herein by reference in its entirety.

The invention claimed is:

1. A communication processing method used in a base station having a plurality of sectors, the communication processing method comprising:

the base station receiving channel state information corresponding to all or some of spare coordinated groups from each of user devices, a first group including a plurality of coordinated groups arranged in advance, each of the coordinated groups being formed of two or more sectors, and the spare coordinated groups corresponding to each of the user devices being selected from the first group and including at least a service sector of best channel quality obtained by measurement of the user device, wherein the spare coordinated group for each user device includes all of the coordinated groups that contain the service sector of best channel quality;

the base station specifying a user device group corresponding to each of coordinated groups included in each of coordinated group patterns, the user device group corresponding to the coordinated group including user devices of which the corresponding spare coordinated groups include the coordinated group;

the base station performing user scheduling on each of the coordinated groups based on channel state information reported by the user devices of the user device group corresponding to the coordinated group; and the base station specifying a user device and a coordinated group pattern to use in transmission based on scheduling results of the coordinated groups, and then performing data transmission based on the specified user device and the specified coordinated group pattern;

the base station obtaining an index of the service sector reported from each of the user devices; and the base station selectin for the user device, the spare coordinated groups including the service sector from the coordinated groups arranged in advance and reporting the spare coordinated groups to the user device, wherein when physical sector indexes of the sectors are different from each other, the index of the service sector is indicated by a physical sector index and when the physical sector indexes of the sectors are same as each other, the index of the service sector is indicated by an antenna index.

2. The communication processing method according to claim 1, wherein the base station reports the spare coordinated groups to the user devices by higher layers.

3. The communication processing method according to claim 1, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are a PMT corresponding to a greatest CQI in the spare coordinated groups.

4. The communication processing method according to claim 1, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are same as each other, and the PMIs reported by the user device is, among all PMIs, such a PMI as to maximize a sum of CQIs corresponding to all the spare coordinated groups.

5. The communication processing method according to claim 1, wherein the base station receives channel state information corresponding to a part of the spare coordinated groups from each of the user devices and a greatest CQI among CQIs of the part of the spare coordinated groups is equal to or greater than a greatest CQI among CQIs of other spare coordinated groups.

6. The communication processing method according to claim 5, wherein in the channel state information corresponding to the part of the spare coordinated groups, PMIs of channels corresponding to the respective spare coordinated groups are a PMI corresponding to the greatest CQI in the spare coordinated groups.

7. The communication processing method according to claim 6 wherein in the channel state information corresponding to the part of the spare coordinated groups, the PMIs of the channels corresponding to the respective spare coordinated groups are same as each other and are such a PMI as to maximize a sum of the CQIs corresponding to the part of the spare coordinated groups.

8. The communication processing method according to claim 7, wherein in the channel state information corresponding to the part of the spare coordinated groups, the CQIs corresponding to the respective spare coordinated groups are same as each other and are a maximum value, a minimum value or an average of CQIs corresponding to the PMIs given as feedback.

9. The communication processing method according to claim 1, wherein the first group is determined by the following expression:

$$\bigcup_{K=1}^{N} \bigcup_{l=0}^{N-1} \{l \bmod N, (l+1) \bmod N, \ldots, (l+K-1) \bmod N\}$$

where N is the number of sectors of a base station, K is the number of coordinated-group sectors, and K= 1, . . . , N.

10. A base station having a plurality of sectors, comprising:

a receiving module configured to receive channel state information corresponding to all or a part of spare coordinated groups from each of user devices, a first group including a plurality of coordinated groups arranged in advance, each of the coordinated groups being formed of two or more sectors, and the spare coordinated groups corresponding to each of the user devices being selected from the first group and including at least a service sector of best channel quality obtained by measurement of the user device, wherein the spare coordinated group for each user device includes all of the coordinated groups that contain the service sector of best channel quality;

a user device group specifying module configured to specify a user device group corresponding to each of coordinated groups included in each of coordinated group patterns, the user device group corresponding to the coordinated group including user devices of which the corresponding spare coordinated groups include the coordinated group;

a scheduling module configured to perform user scheduling on each of the coordinated groups based on channel state information reported by the user devices of the user device group corresponding to the coordinated group;

a communication processing module configured to specify a user device and a coordinated group pattern to use in transmission based on scheduling results of the coordinated groups and perform data transmission based on the specified user device and the specified coordinated group pattern;

a first antenna specifying module configured to obtain an index of the service sector reported from each of the user devices; and a first spare coordinated group processing module configured to select for the user device the spare coordinated groups including the service sector from the coordinated groups arranged in advance and reporting the spare coordinated groups to the user device, wherein when physical sector indexes of the sectors are different from each other an index of the service sector is indicated by a physical sector index and when the physical sector indexes of the sectors are same as each other, the index of the service sector is indicated by an antenna index.

11. The base station according to claim 10, wherein the spare coordinated group processing module reports the spare coordinated groups to the user devices by higher layers.

12. The base station according to claim 10, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are a PMI corresponding to a greatest CQI in the spare coordinated groups.

13. The base station according to claim 10, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are same as each other, and the PMIs reported by the user device is, among all PMIs, such a PMI as to maximize a sum of CQIs corresponding to all the spare coordinated groups.

14. The base station according to claim 10, wherein the base station receives channel state information corresponding to a part of the spare coordinated groups from each of the user devices and a greatest CQI among CQIs of the part of the spare coordinated groups is equal to or greater than a greatest CQI among CQIs of other spare coordinated groups.

15. The base station according to claim 14, wherein in the channel state information corresponding to the part of the spare coordinated groups, PMIs of channels corresponding to the respective spare coordinated groups are a PMI corresponding to the greatest CQI in the spare coordinated groups.

16. The base station according to claim 14, wherein in the channel state information corresponding to the part of the spare coordinated groups, the PMIs of the channels corresponding to the respective spare coordinated groups are same as each other and are such a PMI as to maximize a sum of the CQIs corresponding to the part of the spare coordinated groups.

17. The base station according to claim 16, wherein in the channel state information corresponding to the part of the spare coordinated groups, the CQIs corresponding to the respective spare coordinated groups are same as each other and are a maximum value, a minimum value or an average of CQIs corresponding to the PMIs given as feedback.

18. The base station according to claim 10, wherein the first group is determined by the following expression:

$$\bigcup_{K=1}^{N} \bigcup_{l=0}^{N-1} \{l \bmod N, (l+1) \bmod N, \ldots, (l+K-1) \bmod N\}$$

where N is the number of sectors of a base station, K is the number of coordinated-group sectors, and K= 1, . . . , N.

19. A communication processing method for performing communication between a base station having a plurality of sectors and user devices, the communication processing method comprising:

each of the user devices measuring signal quality of signals received from the respective sectors;

each of the user devices specifying a service sector of best channel quality based on measurement results and reporting an index of the service sector to the base station;

the base station selecting, for each of the user devices, spare coordinated groups from a first group and reporting the spare coordinated groups to the corresponding user device, the first group including a plurality of coordinated groups arranged in advance, each of the coordinated groups being formed of two or more sectors, and the spare coordinated groups corresponding to each of the user devices including at least the service sector of the user device, wherein the spare coordinated group for each user device includes all of the coordinated groups that contain the service sector of best channel quality;

the base station receiving channel state information corresponding to all or a part of the spare coordinated groups from each of the user devices;

the base station specifying a user device group corresponding to each of coordinated groups included in each of coordinated group patterns, the user device group corresponding to the coordinated group including user devices of which the corresponding spare coordinated groups include the coordinated group;

the base station performing user scheduling on each of the coordinated groups based on channel state information reported by the user devices of the user device group corresponding to the coordinated group; and the base station specifying a user device and a coordinated group pattern to use in transmission based on scheduling results of the coordinated groups, and then performing data transmission based on the specified user device and the specified coordinated group pattern, wherein when physical sector indexes of the sectors are different from each other, the index of the service sector is indicated by a physical sector index and when the physical sector indexes of the sectors are same as each other, the index of the service sector is indicated by an antenna index.

20. The communication processing method according to claim 19, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are a PMI corresponding to a greatest CQI in the spare coordinated groups.

21. The communication processing method according to claim 19, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are same as each other, and the PMIs reported by the user device is, among all PMIs, such a PMI as to maximize a sum of CQIs corresponding to all the spare coordinated groups.

22. The communication processing method according to claim 19, wherein the base station receives channel state information corresponding to a part of the spare coordinated groups from each of the user devices and a greatest CQI among CQIs of the part of the spare coordinated groups is equal to or greater than a greatest CQI among CQIs of other spare coordinated groups.

23. The communication processing method according to claim 22, wherein in the channel state information corresponding to the part of the spare coordinated groups, PMIs of channels corresponding to the respective spare coordinated groups are a PMI corresponding to the greatest CQI in the spare coordinated groups.

24. The communication processing method according to claim 22, wherein in the channel state information corresponding to the part of the spare coordinated groups, the PMIs of the channels corresponding to the respective spare coordinated groups are same as each other and are such a PMI as to maximize a sum of the CQIs corresponding to the part of the spare coordinated groups.

25. The communication processing method according to claim 24, wherein in the channel state information corresponding to the part of the spare coordinated groups, the CQIs corresponding to the respective spare coordinated groups are same as each other and are a maximum value, a minimum value or an average of CQIs corresponding to the PMIs given as feedback.

26. The communication processing method according to claim 19, wherein the first group is determined by the following expression:

$$\bigcup_{K=1}^{N} \bigcup_{l=0}^{N-1} \{l \bmod N, (l+1) \bmod N, \ldots, (l+K-1) \bmod N\}$$

where N is the number of sectors of a base station, K is the number of coordinated-group sectors, and K= 1, . . . , N.

27. A communication processing method for performing communication between a base station having a plurality of sectors and user devices, the communication processing method comprising:
the base station reporting a number of sectors included in each of coordinated groups and a number of coordinated groups required to be fed back, to each of the user devices by higher layer signaling;
each of the user devices measuring signal quality of signals received from the respective sectors;
each of the user devices specifying a service sector of best channel quality based on measurement results;
each of the user devices selecting, for itself, spare coordinated groups from a pre-stored first group, the first group including a plurality of coordinated groups arranged in advance, each of the coordinated groups being formed of two or more sectors, and the spare coordinated groups corresponding to each of the user devices including at least the service sector of the user device,
wherein the spare coordinated group for each user device includes all of the coordinated groups that contain the service sector of best channel quality;
the base station receiving channel state information corresponding to all or a part of the spare coordinated groups from each of the user devices;
the base station specifying a user device group corresponding to each of coordinated groups included in each of coordinated group patterns, the user device group corresponding to the coordinated group including user devices of which the corresponding spare coordinated groups include the coordinated group;
the base station performing user scheduling on each of the coordinated groups based on channel state information reported by the user devices of the user device group corresponding to the coordinated group; and
the base station specifying a user device and a coordinated group pattern to use in transmission based on scheduling results of the coordinated groups, and then performing data transmission based on the specified user device and the specified coordinated group pattern,
wherein when physical sector indexes of the sectors are different from each other, the index of the service sector is indicated by a physical sector index and when the physical sector indexes of the sectors are same as each other, the index of the service sector is indicated by an antenna index.

28. The communication processing method according to claim 27, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are a PMI corresponding to a greatest CQI in the spare coordinated groups.

29. The communication processing method according to claim 27, wherein the base station receives the channel state information corresponding to all of the spare coordinated groups from each of the user devices and in the channel state information corresponding to all the spare coordinated groups reported by the user device, PMIs of channels corresponding to the respective spare coordinated groups are same as each other, and the PMIs reported by the user device is, among all PMIs, such a PMI as to maximize a sum of CQIs corresponding to all the spare coordinated groups.

30. The communication processing method according to claim 29, wherein the base station receives channel state information corresponding to a part of the spare coordinated groups from each of the user devices and a greatest CQI among CQIs of the part of the spare coordinated groups is equal to or greater than a greatest CQI among CQIs of other spare coordinated groups.

31. The communication processing method according to claim 30, wherein in the channel state information corresponding to the part of the spare coordinated groups, PMIs of channels corresponding to the respective spare coordinated groups are a PMI corresponding to the greatest CQI in the spare coordinated groups.

32. The communication processing method according to claim 30, wherein in the channel state information corresponding to the part of the spare coordinated groups, the PMIs of the channels corresponding to the respective spare coordinated groups are same as each other and are such a PMI as to maximize a sum of the CQIs corresponding to the part of the spare coordinated groups.

33. The communication processing method according to claim 32, wherein in the channel state information corresponding to the part of the spare coordinated groups, the CQIs corresponding to the respective spare coordinated groups are same as each other and are a maximum value, a minimum value or an average of CQIs corresponding to the PMIs given as feedback.

34. The communication processing method according to claim 27, wherein the first group is determined by the following expression:

$$\bigcup_{K=1}^{N}\bigcup_{l=0}^{N-1}\{l \bmod N, (l+1)\bmod N, \ldots, (l+K-1)\bmod N\}$$

where N is the number of sectors of a base station, K is the number of coordinated-group sectors, and K= 1, ..., N.

* * * * *